United States Patent
Prudnikov

(10) Patent No.: US 8,240,855 B2
(45) Date of Patent: Aug. 14, 2012

(54) DIFFUSER HAVING SHAPE PROFILE FOR REDUCING SPECKLE NOISE AND A LASER PROJECTION SYSTEM EMPLOYING THE SAME

(75) Inventor: Oleg Prudnikov, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1387 days.

(21) Appl. No.: 11/841,023

(22) Filed: Aug. 20, 2007

(65) Prior Publication Data

US 2008/0129891 A1    Jun. 5, 2008

(30) Foreign Application Priority Data

Dec. 1, 2006  (KR) .................. 10-2006-0120976

(51) Int. Cl.
*G03B 21/14*   (2006.01)
*G03B 21/26*   (2006.01)
*G02B 27/10*   (2006.01)

(52) U.S. Cl. .............. 353/38; 353/94; 359/619
(58) Field of Classification Search .............. 353/31–33, 353/38, 94; 359/599, 618–621
See application file for complete search history.

(56) References Cited

U.S. PATENT DOCUMENTS

| | | | |
|---|---|---|---|
| 4,035,068 A | 7/1977 | Rawson | |
| 4,336,978 A * | 6/1982 | Suzuki | 359/599 |
| 6,169,634 B1 | 1/2001 | Sirat | |
| 6,323,984 B1 | 11/2001 | Trisnadi | |
| 6,594,090 B2 * | 7/2003 | Kruschwitz et al. | 359/707 |
| 6,747,781 B2 * | 6/2004 | Trisnadi | 359/279 |
| 6,895,149 B1 | 5/2005 | Jacob et al. | |
| 6,975,294 B2 | 12/2005 | Manni et al. | |
| 7,271,962 B2 * | 9/2007 | Kasazumi et al. | 359/707 |
| 2004/0136038 A1 * | 7/2004 | Holmes et al. | 359/15 |
| 2008/0192327 A1 * | 8/2008 | Abu-Ageel | 359/237 |

FOREIGN PATENT DOCUMENTS

| | | |
|---|---|---|
| JP | 2003098476 A | 4/2003 |
| JP | 2003-279889 A | 10/2003 |
| KR | 10-2003-0046500 A | 6/2003 |
| KR | 10-2005-0016268 A | 2/2005 |
| KR | 10-2006-0055869 A | 5/2006 |

OTHER PUBLICATIONS

Jahja I. Trisnadi, "Speckle contrast reduction in laser projection displays", Proc. SPIE 4657, 131 (2002); doi:10.1117/12.463781.*
D.M. Bloom, "The Grating Light Valve: revolutionizing display technology", SPIE vol. 3013, pp. 165-171.

(Continued)

*Primary Examiner* — Tony Ko
*Assistant Examiner* — Jori S Reilly-Diakun
(74) *Attorney, Agent, or Firm* — Sughrue Mion, PLLC

(57) ABSTRACT

A diffuser having a shape for reducing speckle noise and a laser projection system including the diffuser are provided. The diffuser is employed by a laser projection system to reduce speckle noise, and includes a scattering pattern. The scattering pattern includes a plurality of scattering ribbons, and a curved surface of each of the plurality of scattering ribbons satisfies equations so that speckle noise is minimized for an aperture size of an optical system.

18 Claims, 4 Drawing Sheets

OTHER PUBLICATIONS

E.V. Ivakin, et al., "Transformation of the spatial coherence of pulsed laser radiation in a delay line", Quantum Electronics, vol. 33, No. 3, 2003, pp. 255-258.

Jahja Trisnadi, "Hadamard speckle contrast reduction", Optics Letters, vol. 29, No. 1, Jan. 1, 2004, pp. 11-13.

John Goodman, "Some fundamental proprerties of speckle", J. Opt. Soc. Am., vol. 66, No. 11, Nov. 1976, pp. 1145-1150.

Joseph Goodman, "Speckle Phenomena in Optics: Theory and Applications Version 5.0", Aug. 24, 2005, 203 pages.

Lingli Wang, et al., "Speckle reduction in laser projection systems by diffractive optical elements", Applied Optics, vol. 37, No. 10, Apr. 1, 1998, pp. 1770-1775.

Lingli Wang, et al., "Speckle reduction in laser projections with ultrasonic waves", Optical Engineering vol. 39 No. 6, Jun. 2000, pp. 1659-1664.

W. R. Klein, et al., "Unified Approach to Ultrasonic Light Diffraction", IEEE Transactions on Sonics and Ultrasonics, vol. SU-14, No. 3, Jul. 1967, pp. 123-134.

* cited by examiner

DIFFUSER HAVING SHAPE PROFILE FOR REDUCING SPECKLE NOISE AND A LASER PROJECTION SYSTEM EMPLOYING THE SAME

CROSS-REFERENCE TO RELATED PATENT APPLICATION

This application claims priority from Korean Patent Application No. 10-2006-0120976, filed on Dec. 1, 2006 in the Korean Intellectual Property Office, the disclosure of which is incorporated herein in its entirety by reference.

BACKGROUND OF THE INVENTION

1. Field of the Invention

Apparatuses consistent with the present invention relate to a diffuser with a shape profile for reducing a speckle noise, and a projection system which reduces the speckle noise by employing the diffuser.

2. Description of the Related Art

Projection systems display a color image by modulating light having a plurality of colors corresponding to image information, and extending and projecting the light on a screen. Various kinds of light sources can be used in projection systems. In particular, a laser light source may be preferable, since the laser light source has a high intensity of light and brightness in order to provide a clear image having a high contrast. However, a laser beam of the laser light source is highly coherent, which causes speckle noise. Speckle is a mottled pattern generated by an inherent wave property of a laser beam that is incident on a screen, due to the roughness of a surface of the screen Speckle significantly reduces the image quality.

In order to reduce the speckle noise, an image having N number of uncorrelated speckle patterns should be formed. A speckle contrast C is defined in relation to a dispersion $\sigma_I$ with respect to a mean of the intensity of light <I> due to a speckle ($C=\sigma_I/<I>$). Accordingly, when the N number of uncorrelated speckle patterns are formed, the speckle contrast is reduced by $1/N^{1/2}$ times. Accordingly, it is very important to form the N number of uncorrelated speckle patterns. To do so, various methods have been suggested, such as producing a spatial diversity of laser beam, producing a time diversity of laser beam, enhancing light bandwidth, and performing a phase de-correlation.

An example of the phase de-correlation method is a method in which a driving diffuser is disposed on an image plane. A fine structure of the surface of the driving diffuser may be expressed by a correlation length $r_c$. When the driving diffuser moves by at least the correlation length $r_c$, the uncorrelated speckle patterns are formed. In order to efficiently reduce the speckle, the movement distance of the driving diffuser should be several times the correlation length $r_c$. The ideal case for reducing the speckle is the case when the driving diffuser has a small correlation length $r_c$. In particular, in a scanning projection system having a short pixel lighting time, a movement velocity of the diffuser required for reducing the speckle can be reduced by minimizing the correlation length $r_c$. On the other hand, since a scattering angle is proportional to $\lambda/r_c$, the minimized correlation length $r_c$, increases light scattering on the driving diffuser, which causes an optical loss. Thus, to avoid this loss, an aperture of a projection optical system should be increased. Accordingly, when a compact optical system is designed, there is a limit to simultaneously realize a small aperture size and reduce speckle noise.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a diffuser with a shape profile that reduces speckle noise and minimizes an optical loss, and a laser projection system that reduces the speckle noise by employing the diffuser.

According to an aspect of the present invention, there is provided a diffuser employed in a laser projection system for reducing speckle noise. The diffuser includes a scattering pattern, which may include a plurality of scattering ribbons arranged in a direction of a first axis (X-axis) and extending in a direction parallel to a second axis (Z-axis) Each of the plurality of scattering ribbons may include a second surface, and a height of the second surface with respect to a first surface defined by the first axis and the second axis varies based on a measuring point on the first axis. The second surface may satisfy the following Equations:

$$\frac{d}{dx}h(x) = -\tan(\beta(x))$$

$$\beta(x) = \alpha x,$$

where h(x) is a height of the second surface with respect to the first surface measured from a point x of the first axis if a point on the first surface corresponding to an apex of the second surface is an origin, β(x) is an angle between a line tangent to the second surface and the first axis, and α is a constant.

According to another aspect of the present invention, there is provided a laser projection system including a laser light source, an optical modulator which modulates light generated from the light source corresponding to image information, a projection lens unit which projects modulated light on a screen, and a diffuser disposed on an optical path facing the screen. The diffuser oscillates with respect to an optical axis and includes a scattering pattern, which may have an optimized shape profile to minimize speckle noise with respect to an aperture of an optical system.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
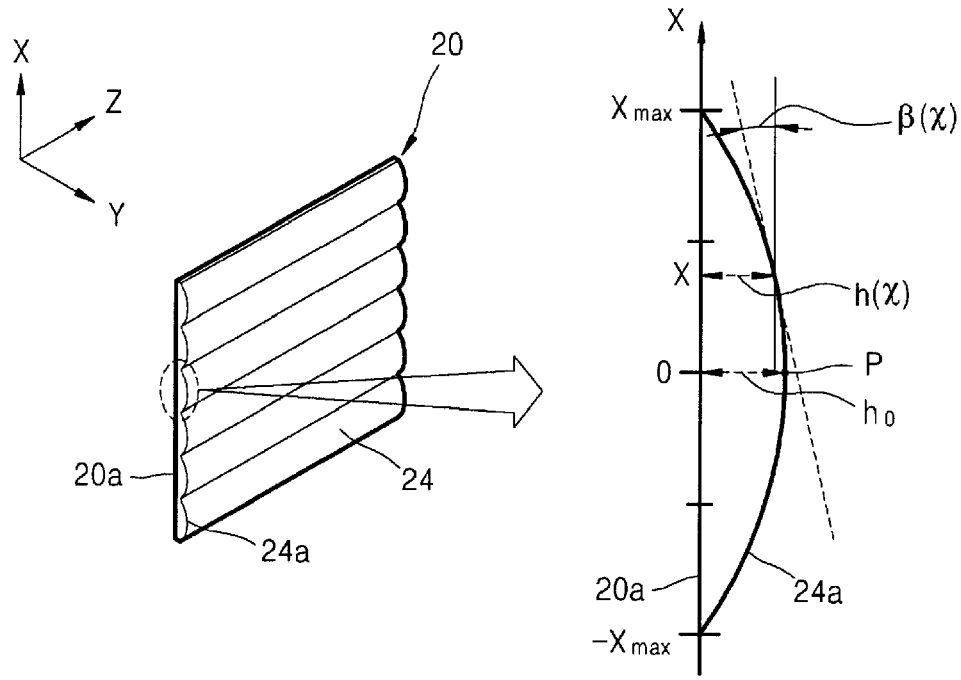
FIG. 1 is a diagram illustrating a diffuser according to an exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted. In the drawings, the thickness of layers and regions are exaggerated for clarity.

FIG. 1 is a diagram illustrating a diffuser 20 according to an exemplary embodiment of the present invention. Referring to FIG. 1, a scattering pattern is formed on a surface of the diffuser 20. The scattering pattern is arranged in a first axis (X-axis) direction, and includes a plurality of convex scattering ribbons 24 extending in a direction parallel to a second axis direction (Z-axis). Each of the convex scattering ribbons 24 includes a second surface 24a. The height of the second surface 24a with respect to a first surface 20a defined by the first axis and the second axis varies based on a measuring point on the first axis. For a measuring point x on the first axis, when the height of the second surface 24a with respect to the first surface 20a is h(x) and an angle between a line tangent to the second surface 24a and the first axis is $\beta(x)$, the second surface 24a is formed to satisfy Equations 1 and 2:

$$\frac{d}{dx}h(x) = -\tan(\beta(x)) \tag{1}$$

$$\beta(x) = \alpha x, \tag{2}$$

where $\alpha$ is a constant greater than 0.

The Equations 1 and 2 optimize a shape of a diffuser so that speckle noise with respect to an aperture of an optical system constituting a laser projection system may be minimized when the diffuser is used in the laser projection system, as will be described later.

Equation 3 can be obtained from Equations 1 and 2:

$$h(x) = h_0 + \frac{\ln(\cos(\alpha x))}{\alpha} = \frac{1}{\alpha}\ln\left[\frac{\cos(\alpha x)}{\cos(\alpha x_{max})}\right]. \tag{3}$$

When $\alpha$ is sufficiently small, h(x) approximately satisfies Equation 4:

$$h(x) = h_0 - \frac{\alpha x^2}{2}, \tag{4}$$

where $h_0$ is the height of an apex of the second surface 24a measured from the first surface 20a.

Figure 2:
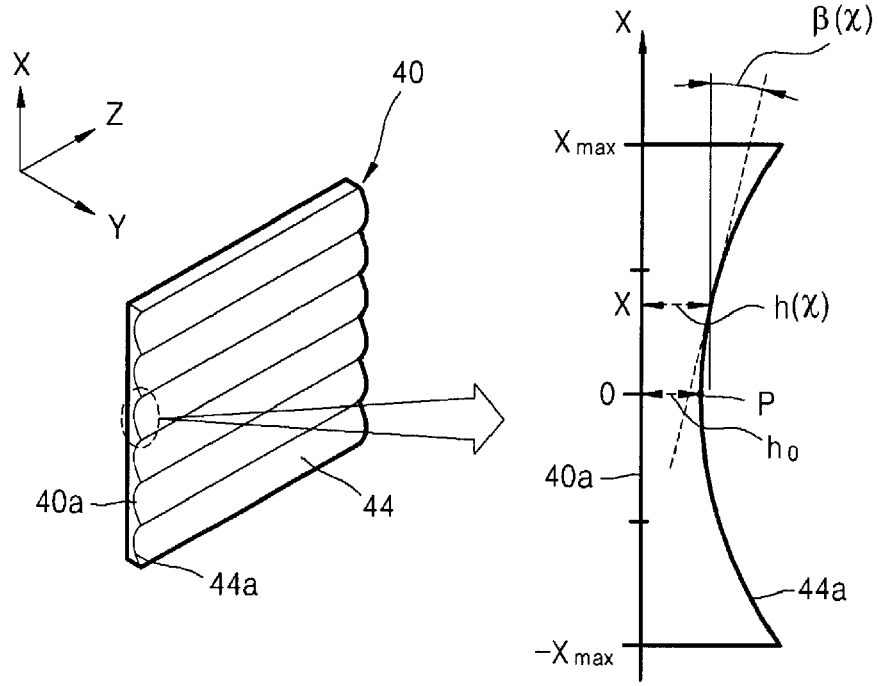
FIG. 2 is a diagram illustrating a diffuser according to another exemplary embodiment of the present invention.

FIG. 2 is a diagram illustrating a diffuser 40 according to another exemplary embodiment of the present invention. Referring to FIG. 2, a scattering pattern is formed on a surface of the diffuser 40. The scattering pattern is formed in a first axis direction (X-axis), and includes a plurality of concave scattering ribbons 44 extending in a direction parallel to a second axis direction (Z-axis). Each of the concave scattering ribbons 44 includes a second surface 44a. The height of the second surface 44a with respect to a first surface 40a defined by the first axis and the second axis varies based on a measuring point on the first axis. For a measuring point x on the first axis, when the height of the second surface 44a with respect to the first surface 40a is h(x) and an angle between a line tangent to the second surface 44a and the first axis is $\beta(x)$, the second surface 44a is formed to satisfy Equations 1, 2, and 3. However, $\alpha$ is a constant less than 0. In addition, when the absolute value of a is small enough, h(x) approximately satisfies Equation 4.

The diffusers 20 and 40 of FIGS. 1 and 2 minimize speckle noise when used in the laser projection system. The diffusers 20 and 40 may be formed of light transmissive materials, or alternatively may be formed so that each of the second surfaces 24a and 44a is a reflective surface. When the diffusers 20 and 40 are formed of light transmissive materials, the diffusers 20 and 40 are arranged so that light may be incident on the first surfaces 20a and 40a to be diffused and transmitted into the second surfaces 24a and 44a, respectively. When each of the second surfaces 24a and 44a is a reflective surface, the diffusers 20 and 40 may be arranged so that light irradiated towards the second surfaces 24a and 44a is diffused and reflected by the scattering pattern.

Figure 3:
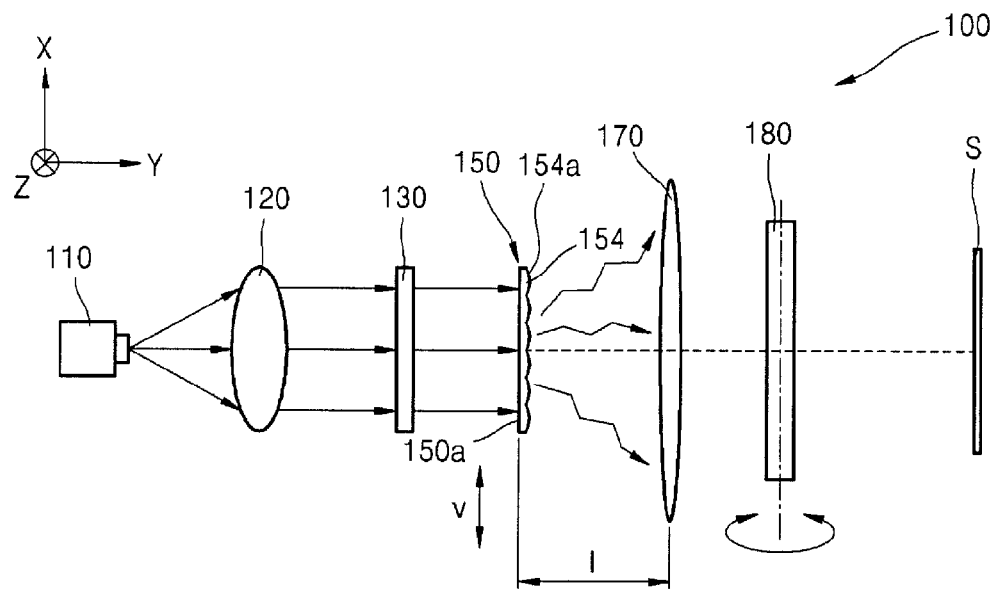
FIG. 3 is a schematic diagram illustrating an optical arrangement of a laser projection system according to an exemplary embodiment of the present invention.

FIG. 3 is a schematic diagram illustrating an optical arrangement of a laser projection system 100 according to an exemplary embodiment of the present invention. Referring to FIG. 3, the laser projection system 100 includes a laser light source 110 which generates and transmits a laser beam, an optical modulator 130 which modulates light corresponding to image information, and a projection lens unit 170 which projects modulated light on a screen S. In addition, a diffuser 150 is disposed on an optical path facing the screen S. A collimating unit 120 which collimates light corresponding to the optical modulator 130 may be disposed on an optical path between the light source 110 and the optical modulator 130. The optical modulator 130 forms a line panel using a light modulation device, such as a grating light valve (GLV) device. In addition, a scanning unit 180 which scans light of the line panel on the screen S is disposed between the projection lens unit 170 and the screen S. Since the diffuser 150 oscillates in the arrow directions for a predetermined period "v" to diffuse and transmit light incident on a first surface 150a of the diffuser 150, the diffuser 150 can minimize speckle noise. To do so, the diffuser 150 includes a scattering pattern with a plurality of scattering ribbons 154, and a profile of a second surface 154a of each of the scattering ribbons 154 has an optimized shape so that speckle noise may be minimized in a given optical system. For example, as described in the detailed description of FIG. 1, an optimized shape may satisfy Equations 1 through 3. In addition, when the absolute value of α is sufficiently small in Equations 1 through 3, the profile of the second surface 154a may satisfy Equation 4. The value of α may be any number except 0, and can be appropriately determined based on the number of speckle patterns N, which is related to a speckle reduction factor R. The relationship between N and α will be described later in terms of an equation. The diffuser 150 may be formed of a light transmissive material. Light diffused and transmitted into the diffuser 150 passes through the projection lens unit 170, and is scanned on the screen S through a scanning unit 180. The scanning unit 180 is rotary driven around an X-axis to form an image on the screen S, and thus scans the light of the line panel in an X-axis direction on the screen S in a Z-axis direction. As illustrated in FIG. 3, a direction toward which light is diffused due to oscillation of the diffuser 150 may be in an X-axis direction, which is a direction perpendicular to a scanning direction on the screen S in the Z-axis direction, considering the moment of inertia of the scanning unit 180. When light is diffused in the X-axis direction, the length of the scanning unit 180 should be enlarged in the X-axis direction. In such case, when the scanning unit 180 is rotary driven around the X-axis, the moment of inertia of the scanning unit 180 linearly increases in proportion to the X-axis length of the scanning unit 180. On the other hand, when light is diffused in the Z-axis direction, which is the scanning direction, the scanning unit 180 should be enlarged in the Z-axis direction, and the moment of inertia of the scanning unit 180 increases in proportion to a square of the Z-axis length of the scanning unit 180. The scattering ribbons 154 of the diffuser 150 may have a convex shape, as illustrated in FIG. 1 and described in the detailed description of FIG. 1. Alternatively the scattering ribbons 154 may have a concave shape, as illustrated in FIG. 2 and described in the detailed description of FIG. 2.

Figure 4:
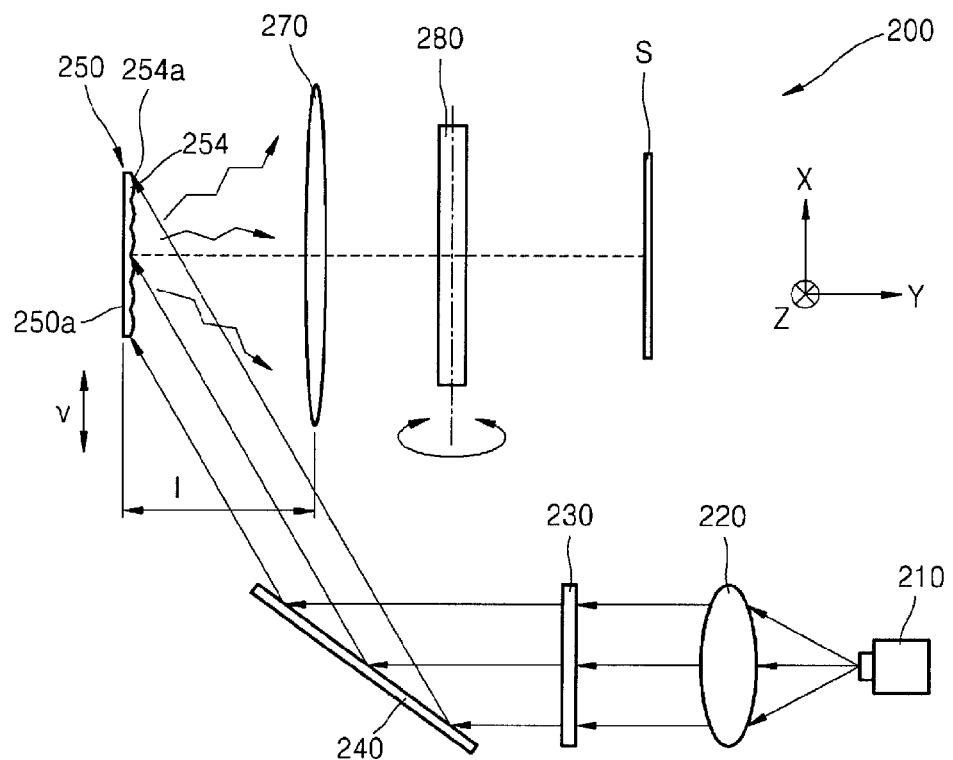
FIG. 4 is a schematic diagram illustrating an optical arrangement of a laser projection system according to another exemplary embodiment of the present invention.

FIG. 4 is a schematic diagram illustrating an optical arrangement of a laser projection system 200 according to another exemplary embodiment of the present invention. The laser projection system 200 of FIG. 4 is different from the laser projection system 100 of FIG. 3 in that a second surface 254a of a diffuser 250 is a reflective surface. Referring to FIG. 4, the laser projection system 200 includes a laser light source 210 which generates and transmits a laser beam, an optical modulator 230 which modulates light corresponding to image information, and a projection lens unit 270 which projects modulated light on a screen S. In addition, a diffuser 250 is disposed on an optical path facing the screen S. A collimating unit 220 which collimates light may be disposed on an optical path between the light source 210 and an optical modulator 230. The optical modulator 230 forms a line panel using a light modulation device, such as a GLV device. Since the diffuser 250 oscillates the arrow directions for a predetermined period "v" to diffuse and reflect light incident on a second surface 254a of the diffuser 250, the diffuser 250 can minimize speckle noise. To do so, the diffuser 250 includes a scattering pattern with a plurality of scattering ribbons 254, and a profile of a second surface 254a of each of the scattering ribbons 254 has an optimized shape so that speckle noise may be minimized in a given optical system. A constant α may be any number except 0, and can be appropriately determined based on the number of speckle patterns N, which is related to a speckle reduction factor R. The relationship between N and a will be described later in terms of an equation. The second surface 254a of the diffuser 250 is a reflective surface. The optical modulator 230 irradiates the light of the line panel towards the second surface 254a of the diffuser 250. An optical path conversion member 240 which converts an optical path may be further formed on an optical path between the optical modulator 230 and the diffuser 250, so that the light of the line panel passes through the second surface 254a of the diffuser 250. Light that is diffused and reflected from the diffuser 250 passes through the projection lens unit 270, and is scanned on the screen S through a scanning unit 280. The scanning unit 280 is rotary driven around an X-axis to form an image on the screen S, and thus scans the light of the line panel in an X-axis direction on the screen S in a Z-axis direction. In addition, a direction toward which light is diffused due to oscillation of the diffuser 250 may be in the X-axis direction, which is a direction perpendicular to a scanning direction in the Z-axis direction on the screen S. Also, the scattering ribbons 254 of the diffuser 250 may have a convex shape, as illustrated in FIG. 1 and described in the detailed description of FIG. 1. Alternatively, the scattering ribbons 254 may have a concave shape, as illustrated in FIG. 2 and described in the detailed description of FIG. 2.

In FIGS. 3 and 4, scanning type projection systems with a line type light modulation device and a scanning unit are described. However, these are exemplary and the present invention is not limited thereto. For example, a full-frame type projection system may also be used in the present invention. However, the scanning type projection system may be preferable, since speckle noise is reduced by a scanning operation for forming an image.

The laser projection systems 100 and 200 according to exemplary embodiments of the present invention reduce the speckle noise as follows.

First, a profile function representing the intensity of light that is diffused by a diffuser and incident on a lens surface of each of the projection lens units 170 and 270 can be given by $$U(x') = A \int e^{i\varphi(x)} e^{-\frac{ikxx'}{L}} dx, \quad (5)$$

where k is $2\pi/\lambda$, $\lambda$ is the wavelength of the light, A is a constant, and L is a distance between the diffuser and the lens surface of each of the projection lens units 170 and 270. $\varphi(x)$ is a phase function determined by a profile h(x) of the second surfaces 154a and 254a. If the diffuser 150 of FIG. 3 is formed of a light transmissive material having a refractive index of n, the phase function $\varphi(x)$ can be given by $$\varphi(x) = k(n-1)h(x) \quad (6)$$

When the second surface 254a is the reflective surface as illustrated in FIG. 4, the phase function $\varphi(x)$ can be given by $$\varphi(x) = 2kh(x). \quad (7)$$

In the case of the embodiment of FIG. 3 in which the diffuser 150 is formed of a light transmissive material having a refractive index of n, N is defined as $N=2\alpha\delta2/\lambda$. In the case of the embodiment of FIG. 4 in which the diffuser 250 including the second surface 254a functioning as the reflective surface, N is defined as $N=(n-1)\alpha\delta2/\lambda$. A profile of the intensity of light can be given by:

$$U(x') = A \int_{-1/2}^{1/2} e^{-2\pi i \left(\frac{N\xi^2}{2} + b\xi\right)} d\xi, \quad (8)$$

where $b=x'\delta/(L\lambda)$, $\delta=2x_{max}$, and A is a constant. $x_{max}$ is the x value indicated in FIGS. 1 and 2.

The above integral equation can be numerically calculated.

Figure 5:
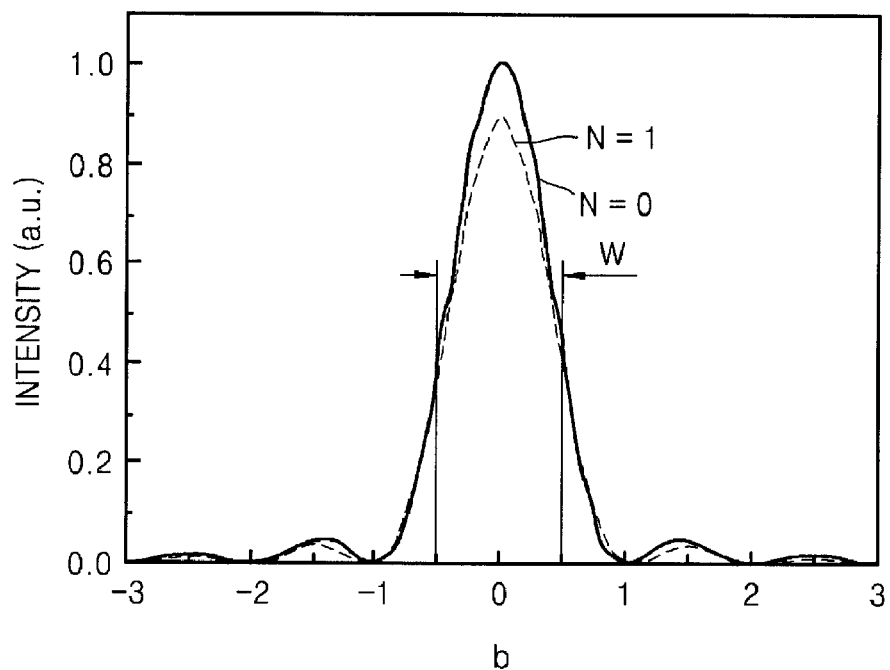
FIG. 5 is a graph illustrating the intensity of light diffused by a scattering ribbon with respect to a variable b, where N=0 and N=1, according to an exemplary embodiment of the present invention.
Figure 6:
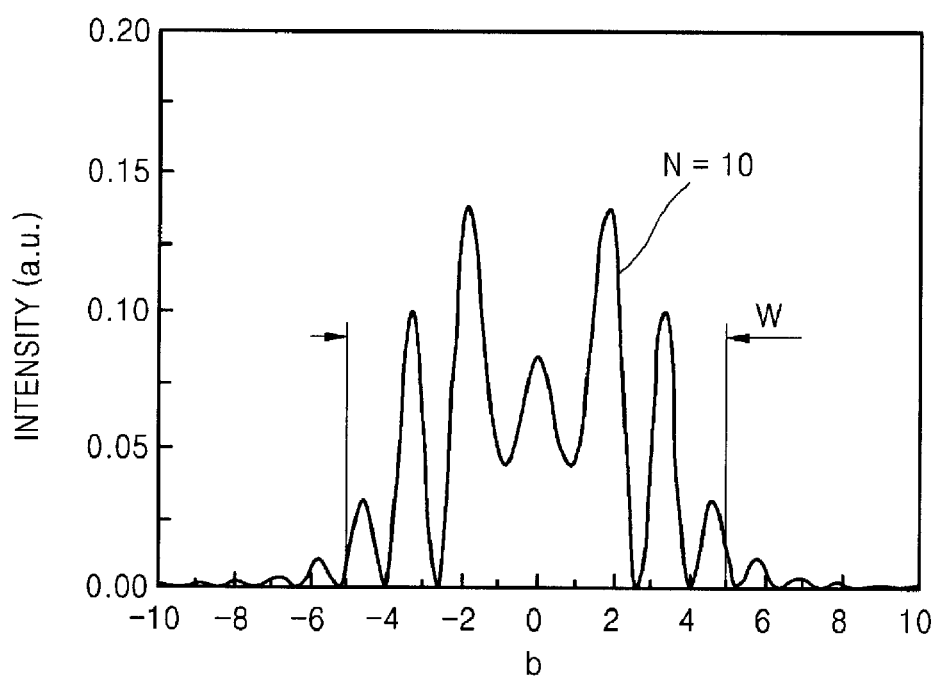
FIG. 6 is a graph illustrating the intensity of light diffused by a scattering ribbon with respect to a variable b, where N=10, according to an exemplary embodiment of the present invention.

FIG. 5 is a graph illustrating the intensity of light diffused by a scattering ribbon with respect to a variable b, where N=0 and N=1, according to an exemplary embodiment of the present invention. In such case, the width W of a profile of the intensity of light satisfies W=Lλ/δ. FIG. 6 is a graph of the intensity of light diffused by a scattering ribbon with respect to a variable b, where N=10, according to an exemplary embodiment of the present invention. In such case, the width W of a profile of the intensity of light on a lens surface approximately satisfies W=NLλ/δ, where W is increased by a factor of N compared with the case where N=1. Accordingly, the size of an aperture of an optical system is increased by a factor of N. Then, a speckle reduction factor R(T) can be given by:

$$R(T) = \left[ 2 \int_0^T \left(1 - \frac{\tau}{T}\right) |\mu(\tau)|^2 d\tau \right]^{-1/2}, \quad (9)$$

where $\mu(\tau)$ is a value determined from the profile function U(x) of Equation 8. That is, $$\mu(\tau) = \frac{\langle U*(\tau)U(0)\rangle}{|U(0)|^2}.$$

Figure 7:
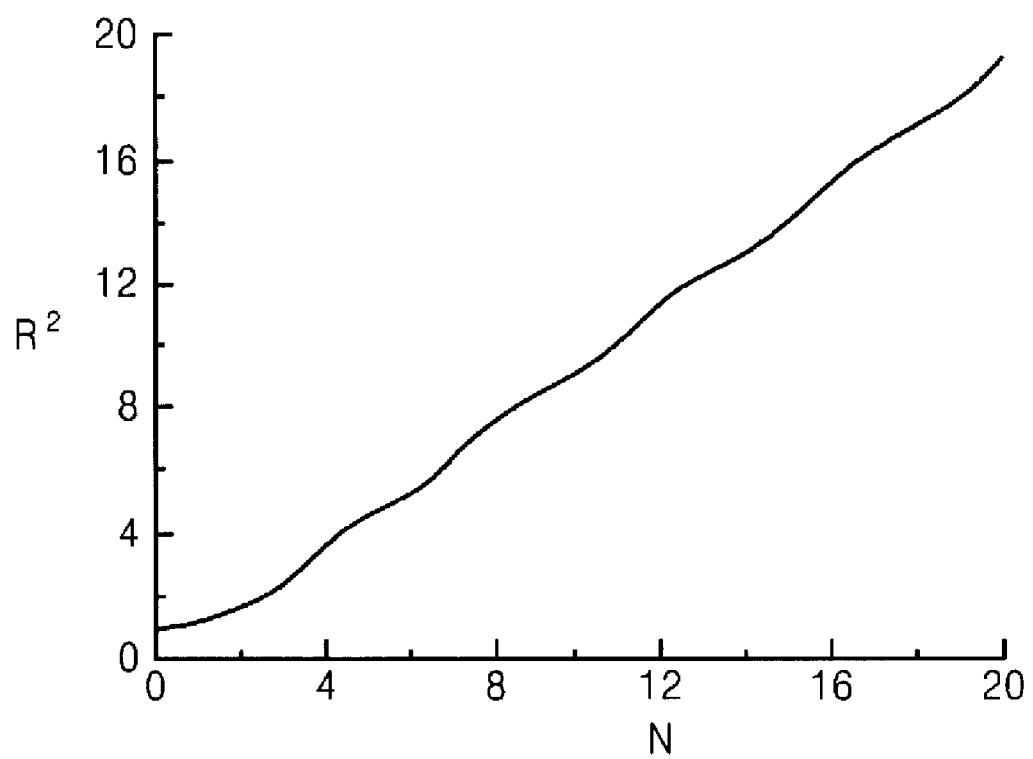
FIG. 7 is a graph of a speckle reduction factor of Equation 9, which is calculated by a numerical integration, according to an exemplary embodiment of the present invention.

This function $\mu(\tau)$ is a periodical function of time $\tau$ with a period T. FIG. 7 is a graph of the speckle reduction factor of Equation 9, which is calculated by a numerical integration. Referring to FIG. 7, it can be seen that a square of the speckle reduction factor $R^2$ is approximately linear with respect to N, and the speckle reduction factor R is proportional to a square root of N.

Meanwhile, the above results satisfy the van Citter-Zernike theorem regarding incoherent light. Really, an absolutely incoherent light focused onto the screen and coming through the fixed size aperture gets coherent properties. The light incoherent only in X direction focused to the screen pixel size δ corresponding to eye resolution pixel size on a screen gets coherent properties with a speckle contrast factor $C \approx 1/\sqrt{N_C}$ where Nc=Wδ/Lλ that corresponds to result of Equation 9 with N=$N_c$. Exemplary embodiments of the present invention using coherent light show results satisfying the van Citter-Zernike theorem regarding the speckle contrast and the aperture size of the projection optical system with respect to incoherent light. This means that the present invention is an optimized result for reducing the speckle noise when coherent light is used in an optical system having a given aperture size.

A diffuser according to exemplary embodiments of the present invention includes a scattering pattern with a plurality of scattering ribbons, wherein the shape of a curved surface of each of the scattering ribbons has a predetermined profile. The profile is formed so that speckle noise is minimized with respect to an aperture size of a given optical system. Accordingly, a laser projection system including the diffuser according to exemplary embodiments of the present invention reduces optical loss and speckle noise.

While the present invention has been particularly shown and described with reference to exemplary embodiments thereof, it will be understood by one of ordinary skill in the art that various changes in form and details may be made therein without departing from the spirit and scope of the present invention as defined by the following claims and their legal

What is claimed is:

1. A diffuser employed in a laser projection system for reducing speckle noise, the diffuser comprising a scattering pattern,
   wherein the scattering pattern comprises a plurality of scattering ribbons arranged in a direction of a first axis and extending in a direction parallel to a second axis, and
   each of the plurality of scattering ribbons comprises a second surface, wherein a height of the second surface with respect to a first surface defined by the first axis and the second axis varies based on a measuring point on the first axis, and the second surface satisfies the Equations $$\frac{d}{dx}h(x) = -\tan(\beta(x))$$

$$\beta(x) = \alpha x,$$

where h(x) is a height of the second surface with respect to the first surface measured from a point x of the first axis if a point on the first surface corresponding to an apex of the second surface is an origin, β(x) is an angle between a line tangent to the second surface and the first axis, and α is a constant.

2. A diffuser employed in a laser projection system for reducing speckle noise, the diffuser comprising a scattering pattern,
   wherein the scattering pattern comprises a plurality of scattering ribbons arranged in a direction of a first axis and extending in a direction parallel to a second axis, and
   each of the plurality of scattering ribbons comprises a second surface, wherein a height of the second surface with respect to a first surface defined by the first axis and the second axis varies based on a measuring point on the first axis, and the second surface satisfies the Equation $$h(x) = h_0 - \frac{\alpha x^2}{2},$$

where h(x) is a height of the second surface with respect to the first surface measured from a point x of the first axis if a point on the first surface corresponding to an apex of the second surface is an origin, $h_0$ is a height of an apex of the second surface, and α is a constant.

3. The diffuser of claim 1, wherein α is greater than 0, and each of the scattering ribbons has a convex shape.

4. The diffuser of claim 1, wherein α is less than 0, and each of the scattering ribbons has a concave shape.

5. The diffuser of claim 1, wherein the diffuser is formed of a light transmissive material.

6. The diffuser of claim 1, wherein the second surface of each of the plurality of scattering ribbons comprises a reflective surface.

7. A laser projection system comprising:
   a laser light source;
   an optical modulator which modulates light generated from the light source corresponding to image information;
   a projection lens unit which projects modulated light on a screen; and
   a diffuser disposed on an optical path facing the screen, wherein:
   the diffuser oscillates with respect to an optical axis and comprising a scattering pattern, the scattering pattern has an optimized shape profile to minimize speckle noise with respect to an aperture of the laser projection system, the scattering pattern comprises a plurality of scattering ribbons arranged in a direction of a first axis and extending in a direction parallel to a second axis, each of the plurality of scattering ribbons comprises a second surface, a height of the second surface with respect to a first surface defined by the first axis and the second axis varies based on a measuring point on the first axis, and wherein the second surface satisfies the Equations $$\frac{d}{dx}h(x) = -\tan(\beta(x))$$
$$\beta(x) = \alpha x,$$

where h(x) is the height of the second surface with respect to the first surface measured from a point x of the first axis if a point on the first surface corresponding to an apex of the second surface is an origin, β(x) is an angle between a line tangent to the second surface and the first axis, and α is a constant.

8. A laser projection system comprising:

a laser light source;

an optical modulator which modulates light generated from the light source corresponding to image information;

a projection lens unit which projects modulated light on a screen; and a diffuser disposed on an optical path facing the screen, wherein:

the diffuser oscillates with respect to an optical axis and comprising a scattering pattern, the scattering pattern has an optimized shape profile to minimize speckle noise with respect to an aperture of the laser projection system, the scattering pattern comprises a plurality of scattering ribbons arranged in a direction of a first axis and extending in a direction parallel to a second axis, each of the plurality of scattering ribbons comprises a second surface, a height of the second surface with respect to a first surface defined by the first axis and the second axis varies based on a measuring point on the first axis, and wherein the second surface satisfies the Equation $$h(x) = h_0 - \frac{\alpha x^2}{2}$$

where h(x) is the height of the second surface with respect to the first surface measured from a point x of the first axis if a point on the first surface corresponding to an apex of the second surface is an origin, $h_0$ is the height of an apex of the second surface, and α is a constant.

9. The laser projection system of claim 7, wherein α is greater than 0, and each of the scattering ribbons has a convex shape.

10. The laser projection system of claim 7, wherein α is smaller than 0, and each of the scattering ribbons has a concave shape.

11. The laser projection system of claim 7, wherein the optical modulator comprises a line type light modulation device, and the laser projection system further comprises a scanning unit which is formed on a optical path between the projection lens unit and the screen, and is driven so that a line panel formed by the optical modulator is scanned in a direction perpendicular to a line direction of the line panel.

12. The laser projection system of claim 11, wherein the diffuser is formed of a light transmissive material.

13. The laser projection system of claim 12, wherein the optical modulator generates and irradiates light of the line panel towards an opposite surface to a surface on which the scattering pattern is formed.

14. The laser projection system of claim 11, wherein a surface on which the scattering pattern is formed comprises a reflective surface.

15. The laser projection system of claim 14, wherein the optical modulator generates and irradiates light of the line panel towards the surface on which the scattering pattern is formed.

16. The laser projection system of claim 15, further comprising:

an optical path conversion member formed on an optical path between the optical modulator and the diffuser, wherein the optical path conversion member converts the light of the line panel so the light proceeds towards the surface on which the scattering pattern is formed.

17. The laser projection system of claim 11, wherein an oscillating direction of the diffuser is perpendicular to a direction along which the scanning unit scans the line panel.

18. The laser projection system of claim 7, wherein the second surface is concave or convex in shape.

* * * * *